(12) United States Patent
Luskind et al.

(10) Patent No.: US 8,417,981 B2
(45) Date of Patent: Apr. 9, 2013

(54) TIME FORMAT CONVERSION METHOD, DEVICE AND SYSTEM

(75) Inventors: Yuri Luskind, Thornhill (CA); Petru Ovidiu Lupas, Markham (CA); Roger Moore, Beeton (CA)

(73) Assignee: Ruggedcom Inc., Ontario (CA)

( * ) Notice: Subject to any disclaimer, the term of this patent is extended or adjusted under 35 U.S.C. 154(b) by 587 days.

(21) Appl. No.: 12/694,537

(22) Filed: Jan. 27, 2010

(65) Prior Publication Data

US 2011/0185214 A1    Jul. 28, 2011

(30) Foreign Application Priority Data

Jan. 26, 2010  (CA) ..................................... 2691023

(51) Int. Cl.
*G06F 1/12*    (2006.01)
(52) U.S. Cl. ......... 713/400; 713/500; 713/501; 713/502
(58) Field of Classification Search .................. 713/400, 713/500, 502, 401, 501, 503
See application file for complete search history.

(56) References Cited

U.S. PATENT DOCUMENTS

| | | | |
|---|---|---|---|
| 6,728,880 B1 * | 4/2004 | Sites | 713/178 |
| 6,868,092 B1 | 3/2005 | Bell et al. | |
| 7,327,693 B1 | 2/2008 | Rivers et al. | |
| 2006/0129864 A1 | 6/2006 | Kynast et al. | |
| 2007/0223477 A1 | 9/2007 | Eidson | |
| 2007/0260906 A1 | 11/2007 | Corredoura | |
| 2007/0280299 A1 | 12/2007 | Latremouille | |
| 2009/0103570 A1 * | 4/2009 | Bjorkman | 370/503 |

FOREIGN PATENT DOCUMENTS

| | | |
|---|---|---|
| EP | 1484869 B1 | 8/2004 |
| EP | 1852990 A2 | 11/2007 |

OTHER PUBLICATIONS http://www.ixxat.com/introduction_ieee_1588_en.html; ixxat. 2004-2010. web. Jan. 27, 2010.

* cited by examiner

*Primary Examiner* — Paul Yanchus, III

(57) ABSTRACT

A method and device for converting between different time domains at a local unit utilizing an processor is disclosed. Time counters to count time in at least two different formats are located locally at each unit. Once a time conversion is initiated, a time stamp is received by the processor and the time counter in the new time domain commences calculating an adjustment count. Once the converted time is received from the processor, the received time plus the adjustment count are summed to provide a time base for the new time domain. The time counters continue counting in their respective time domains after conversion.

21 Claims, 8 Drawing Sheets

TIME FORMAT CONVERSION METHOD, DEVICE AND SYSTEM

CROSS-REFERENCE TO RELATED APPLICATIONS

This application claims priority under 35 USC §119 to Canadian Patent Application No. 2,691,023, filed Jan. 26, 2010 in the Canadian Patent Office,entitled "Time Format Conversion Method, Device and System," the contents of whichare incorporated herein in its entirety by reference.

FIELD OF THE INVENTION

This invention relates to a method device and system for converting from a first time format to a second time format different from the first time format. More particularly, the invention relates to a method, device and system for converting between time domains at local time counters utilizing a local processor and time counters in two different time formats.

BACKGROUND OF THE INVENTION

In the past, there have been different types of time formats used to count time in devices to ensure that actions and events occur correctly. Such time formats include universal time (UTC) formats such as Global Positioning Satellite (GPS) and Inter Range Instruction Group (IRIG-B), as well as time formats which do not use UTC, such as the IEEE 1588 Standard Precision Time Protocol (PTP). The IEEE1588 Standard in particular defines a method for sub-microsecond synchronization of clocks and other devices, such as sensors, actuators and other terminal devices, on a standard Ethernet-based network or other distributed application utilizing commercially available technology. In such systems, typically, there is a master unit and a plurality of slaves.

In PTP, each slave or local unit has a precision clock that provides a local time source. Thus, if a master requires two slave devices to perform actions at the same time, the master sends a message to each slave device, including the time that the action must be performed. However, each slave or local unit must also have a local time counter. The slave devices will then perform the actions at the time referenced by its own local clock. If the clocks on the slaves are not synchronized then the operations may not be performed as desired. Moreover, if the slaves are not all on the same time format, the time must be converted to the appropriate time format for the operations to be performed as desired.

Accordingly, because devices in a network may not all operate in the same time format, it is also necessary to periodically convert from one time format to another time format. Conversion from one time format to another time format will typically occur in a processor due to the complexity of the logical conversion algorithm.

Unfortunately, the processor will likely be performing other tasks when the request for time conversion is made. Furthermore, it is not predictable how long will be required for the processor to complete the other tasks and/or be interrupted to perform the time conversion. As such, there is an inherent CPU latency that arises when time conversion occurs. Clearly, this CPU latency affects the accuracy of the time conversion. Furthermore, the network load and demands on the processor are transient and even over short spans of time cannot be easily estimated. As such, there is an inherent degradation and inaccuracy that arises when the time conversion occurs due to unpredictable CPU latency.

Furthermore, it is appreciated that the same time conversion will be occurring in a number of local units. The time conversion latency at each local unit will differ and could be compounded. It is also understood that if time conversion occurs several times from one source, such as a master unit having a global positioning satellite antenna, each occurrence of time conversion can add additional error such that local nodes located further from the master unit may have an increased accuracy degradation caused by successive conversions. As such, the cumulative error that might arise from time conversion at each of the local units can be significant such that the local units will not all be synchronized and the operations may not be performed as desired.

Other prior art systems have used GPS antennas at each subnet to facilitate the transfer of timing information across remotely located subnets and increase accuracy amongst remotely located subnets. However, such systems are limited to GPS time formats because they obtain the time from orbiting satellites and cannot easily utilize non-UTC time formats such as the 1588 Standard. Furthermore, such systems require a separate GPS antenna at each subnet which increases the cost and complexity of the overall system. In addition, if a GPS antenna at one subset fails, the time accuracy throughout the network could be affected.

Accordingly, there is a need in art for a method and device to facilitate conversion between different time formats at a local clock utilizing a processor without accuracy degradation arising from processor latency.

SUMMARY OF THE INVENTION

Accordingly, it is an object of this invention to at least partially overcome some of the disadvantages of the prior art. Also, it is an object of this invention to provide an improved type of time conversion method and device to convert from a first time format to a second time format different from the first time format. It is also an object of the present invention to provide an improved time conversion method and device to account for any CPU processing latency in order to decrease degradation.

Accordingly, in one of its aspects, this invention resides in a method for converting from a first time format to a second time format at a local unit connected to a network utilizing a processor in the local unit, said second time format different from the first format, said method comprising: utilizing a first counter at the local unit to count time in the first time format; receiving at a processor interface a latch time request signal from the processor; in response to the latch time request signal, sending a set time signal representing current time in the first time format to the processor representing time of receipt of the latch time request signal in the first time format, and, substantially simultaneously commencing an adjustment time counter in a second counter at the local unit to count adjustment time in the second time format; receiving a set time converted signal from the processor representing the current time converted into the second time format; in response to receiving the set time converted signal, summing the set time converted in the second time format as represented by the set time converted signal received from the processor to the adjustment time counted in the adjustment time counter in the second counter; and initializing a time base in the second counter in the second time format based on the sum of the set time converted in the second time format and the adjustment time counted in the adjustment counter in the second counter in the second time format.

In a further aspect, the present invention resides in a device for facilitating conversion between a first time format and a second time format different from the first time format, utilizing a processor, said device comprising: a processor interface for sending and receiving signals to and from the processor; a first counter for counting time in the first time format; a second counter for counting time in the second time format; a time update controller connected to the first time counter, the second time counter and the processor interface; wherein, when the processor interface receives a latch time request signal from the processor, the update controller sends a set time signal representing current time in the first time format to the processor and commences an adjustment counter in the second counter in the second time format; and wherein, when the processor interface receives a set time converted signal representing the current time converted to the second time format from the processor, the second counter sums the set time converted to the second time format as represented by the set time converted signal with the contents of the adjustment counter in the second counter to initialize a time base in the second time format.

In a still further aspect, the present invention resides in a network having a plurality of nodes, each node connected to the network and communicating with at least one other remotely located node connected to the network, a system for converting between different time formats at the local unit, said system comprising: in a first node: a first counter for counting time in a first time format; a second counter for counting time in a second time format; a time update controller connected to the first time counter, the second time counter and the external processor interface; a processor for converting time in the first time format to the second time format: a processor interface for sending and receiving signals to and from the processor; wherein when the processor interface receives a latch time request signal from the processor, the update controller sends a set time signal representing the current time in the first time format to the processor and commences an adjustment counter in the second counter in the second time format; wherein when the processor receives the set time signal, the processor converts the current time as represented by the set time signal from the first time format to the second time format and sends a set time converted signal representing the current time converted to the second time format; and wherein when the processor interface receives the set time converted signal from the processor, the second counter sums the set time converted to the second time format as represented by the set time converted signal, with the contents of the local adjustment counter to initialize a time base in the second time format.

Accordingly, one advantage of the present invention is that the processor latency during a time conversion can be better accounted for. Thus, the conversion degradation from CPU processing latency is lessened even if the processor is running multitask software when requested to perform a time conversion. In one preferred aspect of the invention, this latency is accounted for using the adjustment counters.

Another advantage of the present invention is that the local counters can count time in both the first time format and the second time format such that the adjustment time can be counted in the new format to which the conversion is occurring. In this way, a more accurate conversion can be made because the adjustment time is being counted in the new time format and can be more easily added to the time received from the external processor.

However, in a preferred embodiment, because counters are present in all of the time formats, once a conversion is made, the local unit can count time in both formats. This will decrease the number of time conversions that are required. In addition, if the local unit must provide time signals in more than one time format, counting time in both time formats permits the local unit to do so more quickly and efficiently.

A further advantage of the present invention is that GPS antennas are not required at each subnet. This decreases the overall cost of installing and maintaining the system. A further advantage is that different subnets can utilize non-UTC time formats, such as the IEEE 1588 Standard, at remotely located subnets, and accurately account for time delays in transmitting timing signals.

A further advantage is that the same method and device can convert time to and from UTC time formats. This increases the versatility of the device and permits the device to be connected to a non-UTC time format network, such as a network utilizing IEEE time format.

A further advantage is that the device can be used as a bridge between networks utilizing different time formats or sub-networks and devices utilizing older time formats. For instance, in one embodiment, a local unit comprising a device according to one embodiment of this invention could be located between a network utilizing an IEEE 1588 time format and devices utilizing an older time format such as IRIG-B and act as a bridge between the networks operating in the different time formats.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Preferred embodiments of the invention and its advantages can be understood by referring to the present drawings. In the present drawings, like numerals are used for like and corresponding parts of the accompanying drawings.

Figure 1:
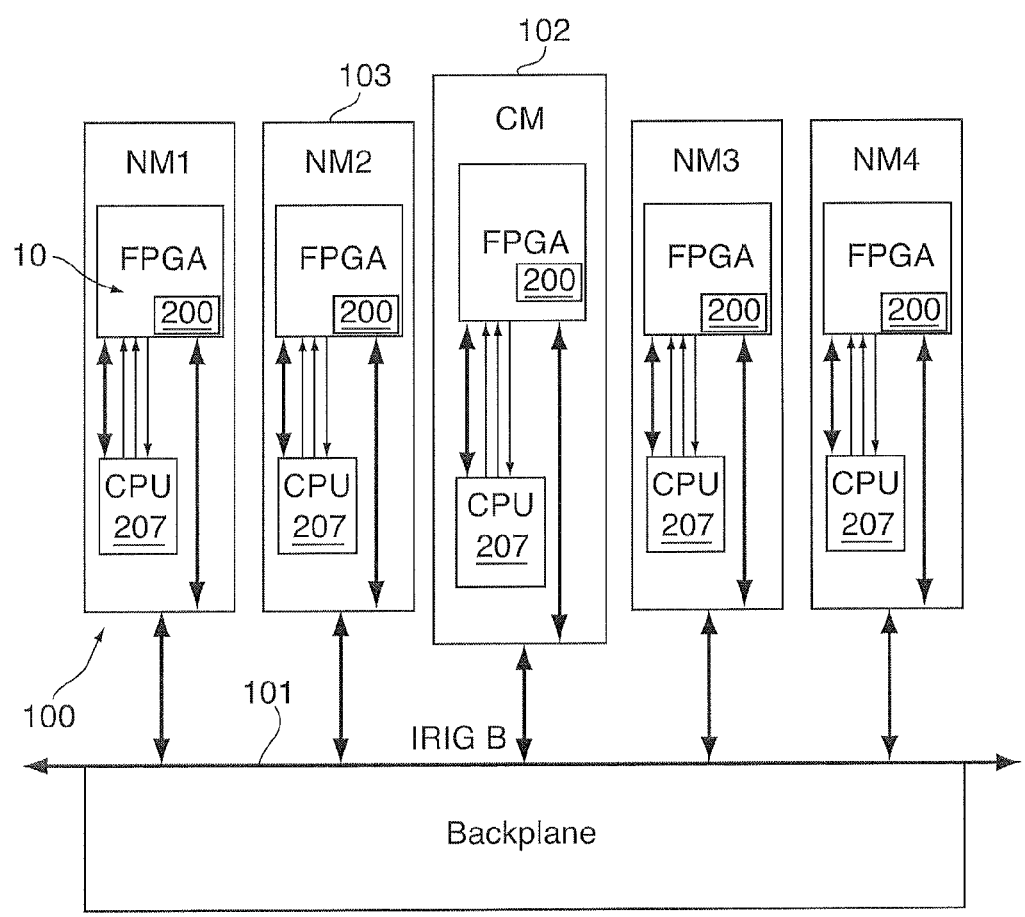
FIG. 1 is a block diagram illustrating time conversion and synchronization through a backplane of a chassis utilizing IRIG B and a control module and line modules comprising devices according to one embodiment of the present invention.
Figure 2:
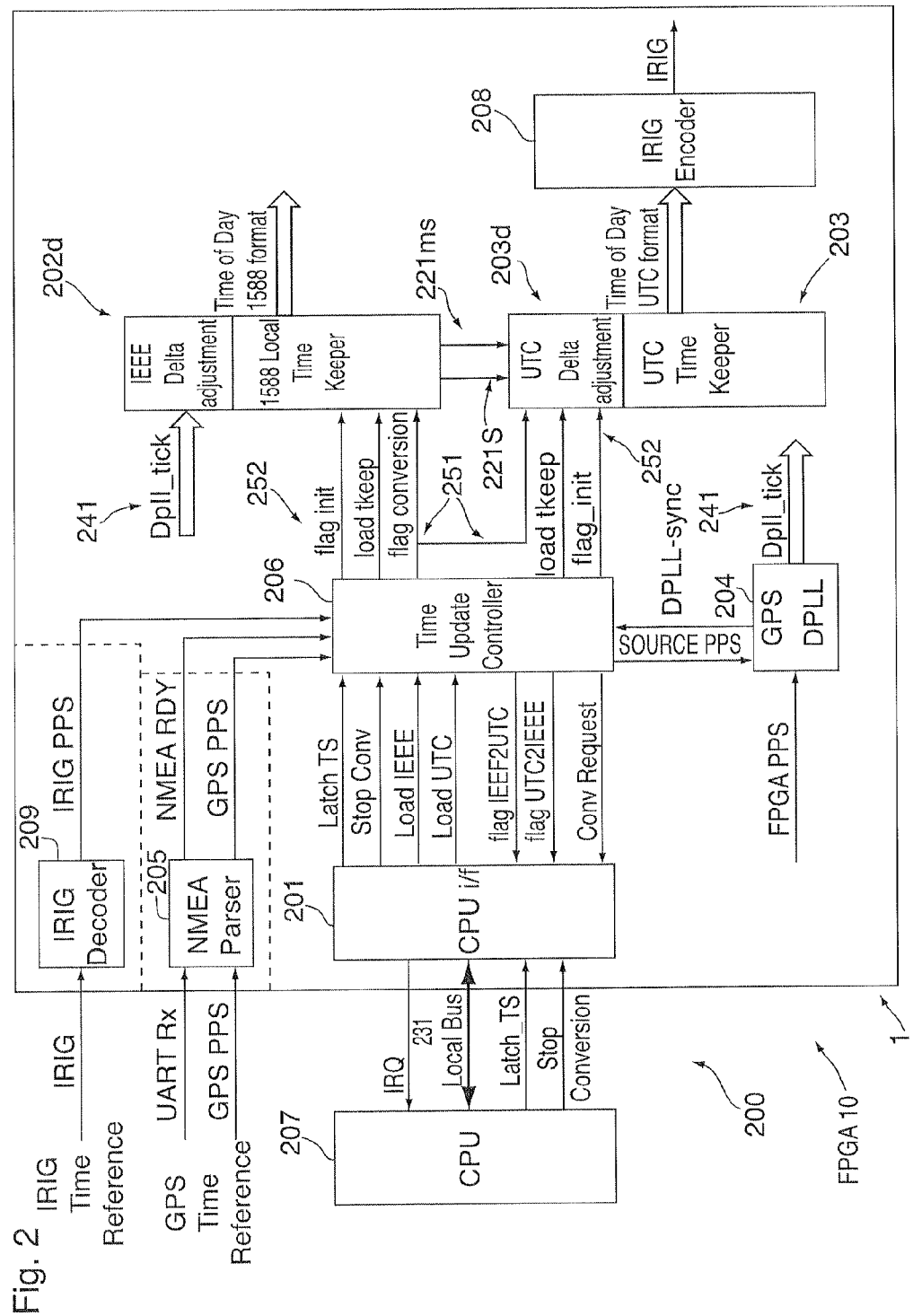
FIG. 2 is a schematic diagram illustrating the device to facilitate time format conversion according to one embodiment of the present invention.

As shown in FIG. 2, one embodiment of the present invention relates to a device for facilitating time format conversion, shown generally by reference numeral 200, which may be located in a local unit, shown generally by reference numeral 1. The local unit 1 can be any type of unit that has a processor 207 and can be connected to an overall network as shown generally by reference numeral 800 in FIG. 8. In the embodiment illustrated in FIG. 2, the local unit 1 comprises a field programmable gate array (FPGA) 10. The device 200 may also be located in a control module (CM) 102 or line module (NM) 103 as illustrated for instance in FIG. 1 or any other type of module. As also illustrated in FIG. 1, the central module 102 and line modules 103 also comprise an FPGA 10 which comprise the device 200.

The device 200, in a preferred embodiment, comprises a processor interface (CPU i/f) 201 for interfacing with the processor (CPU) 207 of the local unit 1.

The processor interface 201 sends and receives signals, such as the interrupt signal (IRQ), latch time request signal (Latch TS) and the stop conversion signal (StopConversion) to the processor 207. There is also a local bus 231 between the CPU interface 201 and the processor 207 to transfer data. It is understood that there is also a local bus (not shown) on the device 200 connecting the various components, but for ease of illustration, it has not been shown. As will be appreciated by persons skilled in the art, the device 200 may comprise discrete components on a main or motherboard, discrete components on separate boards, or may be integrated in a single chip depending on the specific design considerations.

In one embodiment, the processor interface 201 communicates with a time update controller 206. The time update controller 206 consists of a state machine that monitors and controls the operation of all of the time related modules inside the FPGA 10 and, in particular, on the device 200. Based on the time reference selection configuration inputs from the processor 207, the time update controller 206 will control the flow of data and proper initialization of the time keepers 202, 203 which, in this embodiment, comprise the 1588 local time keeper, shown generally by reference 202, and the UTC time keeper, shown generally by reference numeral 203.

The time keepers 202, 203 maintain the local time for the local unit 1. The IEEE time keeper 202 maintains the local time in the 64 bit IEEE 1588 time format. The UTC time keeper 203 maintains the local time in the UTC time format. It is understood that the IEEE and UTC time formats have been selected as preferred embodiments, but any other time formats could also be used. Furthermore, it is understood that the present invention is not limited to any particular type of time format, whether UTC time format or IEEE 1588 time format. Rather, the invention is being described in terms of a preferred embodiment where the time formats are UTC and IEEE 1588 because they are relatively common at the present date, but it is understood the present invention is not limited to these time formats nor any other specific time formats now in existence or that may be developed in the future. Furthermore, the present invention is expandable to more than three time formats with the implementation of more than two time keepers (not shown).

The time base contained within the IEEE time keeper 202 is the main time base of the local unit 1, according to this preferred embodiment. It will need to be synchronized at all times, within the required accuracy, with its current time reference. Synchronization may be achieved to the selected time reference. The selected time reference could be the GPS clock module (residing on the same board, or external to the device), a 1588 Master time reference, a IRIG_B time signal provided by an external device, or an NTP client software module running on the CPU or the CPU Real Time Clock (RTC), for example. As indicated in FIG. 2, when synchronization is to be made to a GPS clock module, the GPS time reference, as shown in FIG. 2 may be used. The GPS time reference will have signals arriving on the GPS PPS line and the UART Rx line. In cases where an IRIG B time signal is used from an external device, this is shown as the IRIG time reference which arrives into the IRIG decoder 209 through the IRIG line. In the cases where a 1588 master device provides a 1588 time reference, this may be provided from the CPU 207 through the local bus 231 or through another local bus from an external device (not shown). The required accuracy in one preferred embodiment will be below 100 ns in most cases, but higher levels of accuracy may also be required and possible.

As illustrated in FIG. 2, in this preferred embodiment, the UTC time keeper 203 is being driven by the IEEE time keeper 202 as illustrated by lines 221s and 221ms in FIG. 2. In particular, the UTC time keeper 203 receives one pulse per millisecond time reference (1K PPS) on the 221ms line and a 1 pulse per second on the 221s references lines. This permits the UTC time keeper 203 to properly increment its own millisecond and second time units as discussed in more detail below. It is understood that other arrangements between the time keepers 202 and 203 are also possible. For instance, the UTC time keeper 203 could be driving the IEEE time keeper 202, or other time keepers (not shown).

The GPS DPLL module 204 illustrated in FIG. 2 facilitates maintaining the required accuracy with a GPS or IRIG_B time reference. Because the GPS/IRIG_B system and the local time base are running from different oscillators, the GPS DPLL module 204 will assist in monitoring and correcting the inherent drift between the two oscillators, by taking corrective measures through the DPLL tick control signals 241. The DPLL tick control signals 241 control the amount by which the IEEE time keeper 202 increments each clock tick. The GPS DPLL module 204 is used in both GPS and IRIG_B time references. Through the time update controller 206, based on the specific software configuration, the GPS PPS or IRIG_B PPS signals are multiplexed to the input of the GPS DPLL as the Source PPS signal. The GPS DPLL module 204 measures and corrects for the offset between the Source PPS signal and the FPGA PPS which is the local PPS generated by the 1588 Time Keeper 202 in this embodiment.

The NMEA parser module 205 illustrated in FIG. 2, performs parsing of the NMEA (National Marine Electronics Association) message in order to determine what time is referenced by each GPS PPS (pulse per second) reference signal received from the GSP reference. Through the CPU interface module 201 and the time update controller 206, the NMEA parser module 204 reports the GPS time to the processor 207 as one possible reference for the time conversion algorithm.

Each of the time keepers 202, 203 also have a delta adjustment, illustrated generally by reference numeral 202d and 203d, respectively. The delta adjustments 202d, 203d, in one preferred embodiment, count the adjustment time in the corresponding local time format from when a latch time request signal for time conversion ($Latch_{13}$ TS) is sent from the processor 207 until the set time converted signal (StopConversion) together with the converted time is returned from the processor 207. This accounts for the latency of the processor 207 while the time conversion is performed.

After a time conversion, the processor 207 returns the stop conversion StopConversion signal, along with the value of the converted time on the local bus 231. The controller 206 receives the stop conversion StopConversion signal from the interface 201 and the Time Update Controller 206 generates the load time keeper Load_tkeep pulse signals which are the loadUTC signal for the UTC Time Keeper 203 and load IEEE signal for the IEEE Time Keeper 203. The corresponding load_tkeep pulses trigger the corresponding Time Keepers 202, 203 to add the CPU converted value received from the processor 207 with the internal counted time conversion delta as counted by the corresponding delta adjustment counters 202d, 203d. The value of the CPU converted time received from the processor 207 is sent through the internal bus of the device 200, which is not shown for ease of illustration, but appears as the CPU_sec and CPU_nsec lines 330 and 430 in FIGS. 3 and 4 respectively.

Figure 3:
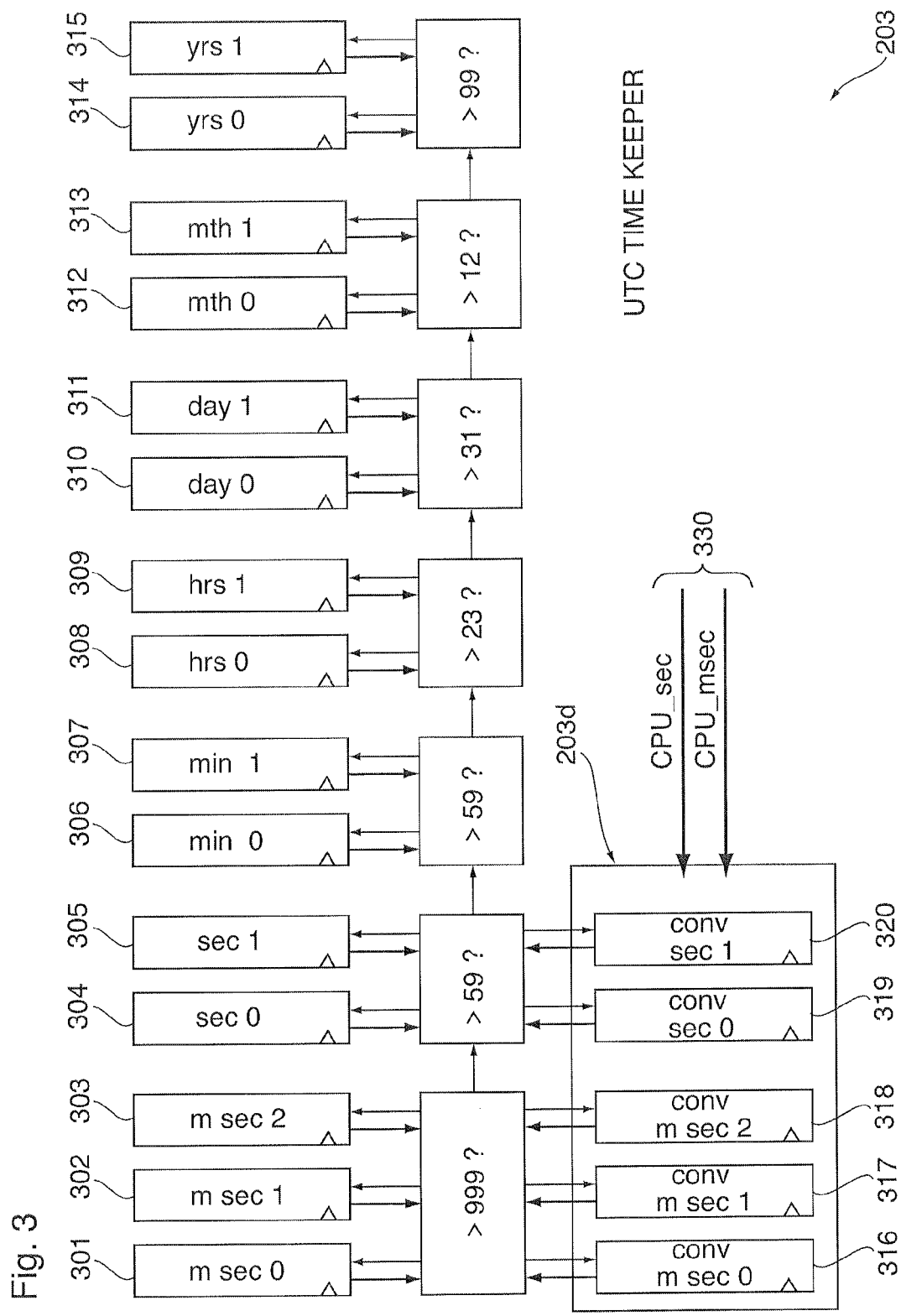
FIG. 3 illustrates the internal components of the UTC time keeper with delta adjustment time counters according to one embodiment of the present invention.

As illustrated in FIG. 3, which is a more detailed schematic representation of the UTC time keeper 203, the universal time format is maintained in UTC format using the counters identified as reference numerals 301 to 315. The counters 301, 302 and 303 count milliseconds, counters 304 and 305 count seconds, counters 306 and 307 count minutes, counters 308 and 309 count hours, counters 310 and 311 count days, counters 312 and 313 count months and counters 314 and 315 count years. Whenever the millisecond rollover 221 MS or the 1 PPS signal 221s from the IEEE time keeper 202 is asserted, the roll over propagates through all affected digits, based on each counter's 301 to 315 arithmetic. In a preferred embodiment, the counters 301 to 315 are binary coded decimal (BCD) counters, but other counters could also be used.

Figure 4:
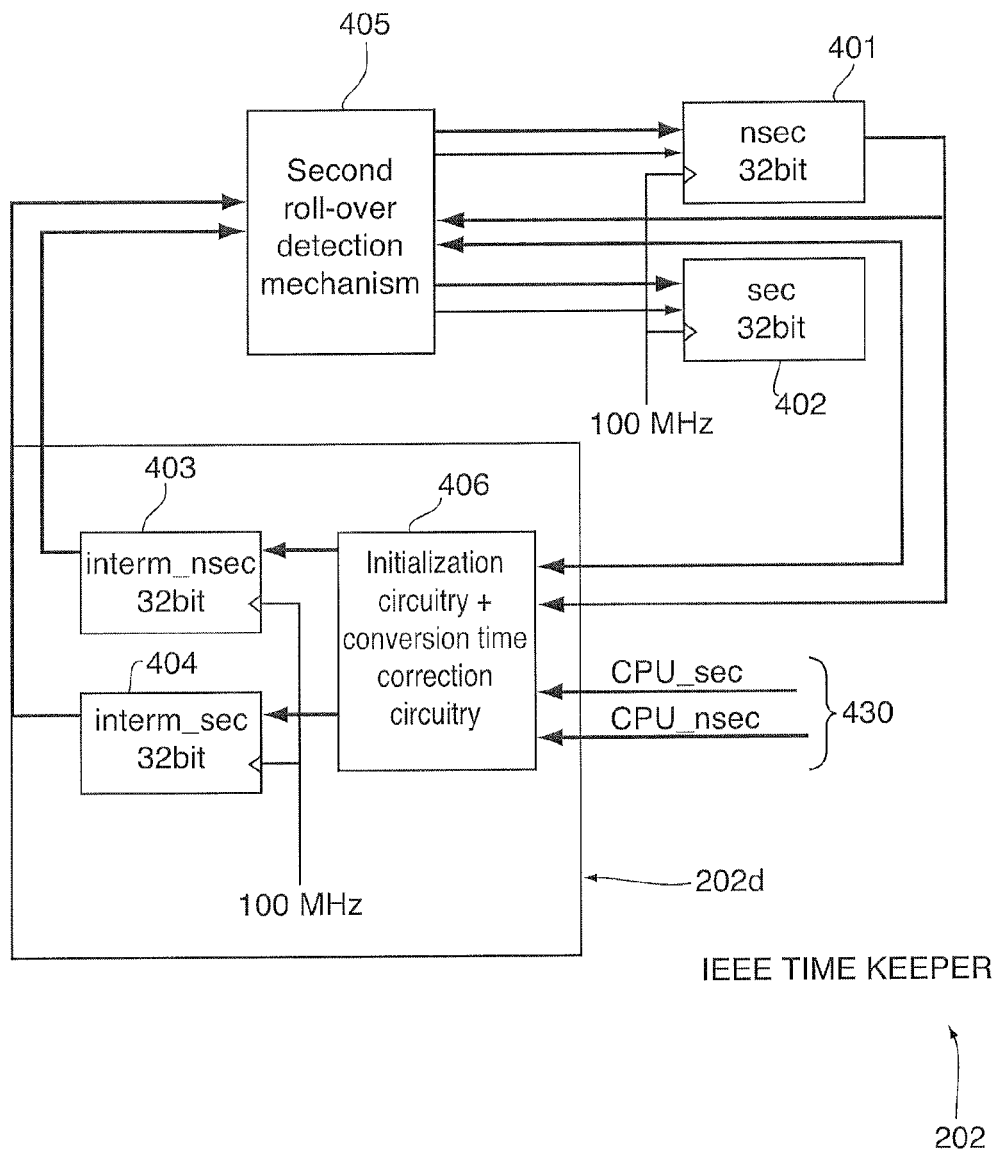
FIG. 4 illustrates the internal components of the IEEE 1588 local time keeper with a delta adjustment time counters according to one embodiment of the present invention.

FIG. 4 is a schematic diagram illustrating the internal operation of the IEEE time keeper 202 in greater detail. As illustrated in FIG. 4, the IEEE 1588 time format is maintained with a 32-bit nanosecond counter, shown by reference numeral 401, and by a 32-bit second counter, shown by reference numeral 402. A 100 MHz oscillator clock signal is sent to both of these 32 bit counters 401, 402. Whenever the 32 bit nanosecond counter 402 reaches 1 billion, the second rollover detection mechanism 405 will clear the nanosecond counter 401 and force an increment in the seconds counter 402.

As also illustrated in FIG. 4, the IEEE 1588 counter 202 also comprises a delta adjustment 202d which comprises initialization circuitry and conversion time correction circuitry 406 which receives the time converted signal from the processor 207 on the second CPU_sec and CPU nanosecond CPU_nsec lines 430. The IEEE delta adjustment circuit 202d also comprises a 32 bit interim nanosecond counter 403 and a 32 bit interim second counter 404. The interim nanosecond counter 403 and the interim second counter 404 each also receive a clock signal from an oscillator or clock running at 100 MHz as illustrated in FIG. 4. It is understood that the clock need not run only at 100 MHz, but other clock frequencies, such as 125 MHz are also possible.

As described more fully below, during time conversion from the UTC format to the IEEE format, the interim counters 403, 404 will commence counting once the processor interface 201 receives a latch time request signal Latch_TS from the processor 207 and until the time update controller 206 receives the stop conversion StopConversion signal from the processor 207 and through the CPU interface 201 along with the CPU converted time values from UTC to IEEE. From when the latch time request signal Latch_TS signal is sent to the processor 207 and until the stop conversion signal StopConversion has been received, the interim counters 403,404 will be counting nano seconds through the interim_nsec counter 403 and when necessary, seconds through the interim_sec counter 404. The value counted by the counters 403, 404 will be added to the IEEE converted time signal received from the processor 207 on the local bus 231 and presented on the CPU_sec and CPU_nsec lines 430 in FIG. 4 and the resulting sum will be used to initialize a time base in the IEEE time format. In a preferred embodiment, this can be accomplished by the initialization circuitry and conversion time correction circuitry 406 summing the received converted time, present on the CPU_second and the CPU_nsec lines 430 with the time counted by the interim_nsec counter 403 and interim_sec counter 404 in the IEEE delta adjustment 202d. The resulting sum is sent to the second rollover detection mechanism 405 and used to initialize the nsec counter 401 and the sec counter 402 of the IEEE time keeper 202.

Similarly, the UTC time keeper 203 comprises a UTC delta adjustment 203d illustrated in FIG. 3. The UTC delta adjustment 203d comprises adjustment time counters 316, 317, 318, 319 and 320 for counting the adjustment time in milliseconds and seconds. It is understood that conversion time counters are not necessary for minutes because generally the maximum adjustment time will be less than 60 seconds. The received converted time in the UTC time format is presented on the CPU second CPU_nsec lines 330 in FIG. 3 and summed with the contents of the adjustment time counters 316 . . . 320. The resulting sum is used to initialize the UTC time keeper 203.

The operation of the invention will now be discussed in more detail according to one preferred embodiment with reference to the timing drawings shown in FIGS. 5 and 6 and the time conversion algorithm illustrated in FIG. 7 together with reference to the components illustrated in FIGS. 2 to 4 discussed above.

Figure 5:
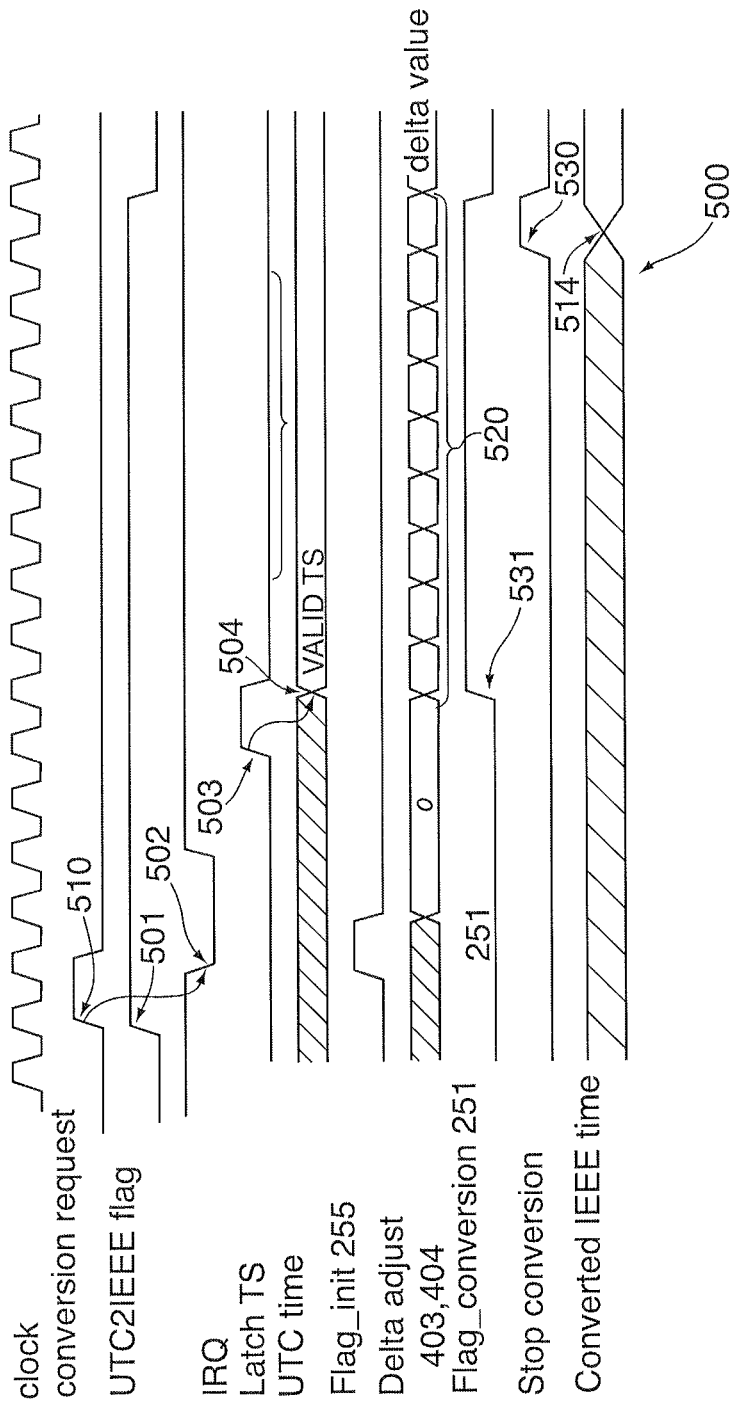
FIG. 5 is a timing diagram illustrating the UTC to IEEE time format conversion.

FIG. 5 illustrates a timing diagram, shown generally by reference numeral 500, showing the status of the signals during a time conversion from UTC to IEEE standard time format. As illustrated in FIG. 5, the time conversion is initially instigated by the time update controller 206 asserting the conversion request ConvRequest signal, shown generally by reference numeral 510, along with the UTC2IEEE flag with the CPU interface 201, shown generally by reference numeral 501 in FIG. 5. Upon receipt of the UTC2IEEE flag 501 and the conversion request ConvRequest 510 signals, the CPU interface 201 will interrupt the CPU 207 by having the interrupt signal IRQ go low, as shown by reference numeral 502. It is understood that if another manner to interrupt the CPU 207 is possible or preferred, such other method may also occur. In response to the interrupt signal IRQ, the processor 207 will send the latch time request signal Latch_TS as shown by reference numeral 503. In response to this latch time request signal Latch_TS, the time update controller 206 will present on the local bus 231 the UTC time for the processor 207, shown by reference numeral 504, and will substantially simultaneously send the flag conversion flag_conversion signal shown in FIG. 2 on the line 251 shown between the time update controller 206 and the time keepers 202, 203 to commence the delta adjustment 202d in the 1588 local time keeper 202. It is understood that the flag conversion signal will only affect the IEEE time keeper 202 in this case because we are converting to the IEEE time format and the IEEE time keeper 202 received by the initiate conversion flag_init signal 252. At this time, the interim_nsec and interim_sec counters 403, 404 in the IEEE delta adjustment 202d will commence counting time. This is also illustrated by reference numeral 520 in FIG. 5 where the delta adjustment counter 403, 404 are varying or counting and this occurs substantially simultaneously with the controller 206 sending the UTC time to the processor 207. Once the processor 207 has converted the UTC time signal into 1588, the processor 207 will assert the stop conversion StopConversion signal shown by reference numeral 530. Once the CPU interface 201 receives the converted time signal on the local bus 231 from the CPU 207 as illustrated by reference numeral 514 and the stop conversion StopConversion signal, as illustrated by reference numeral 530, the converted time signal in IEEE time format will be loaded from the CPU interface 201 to the time update controller 206 and presented on the CPU_sec and CPU_nsec lines 430 shown in FIG. 4. Receipt of the stop conversion signal 530 will also cause the interim_nsec and interim_sec counters 403,404 in the IEEE delta adjustment 202d to discontinue as also illustrated in timing diagram 500 by the delta adjustment counter discontinuing 520 upon receipt of the stop conversion Stop Conversion signal 530. The converted time 514 from the processor 207 will then be loaded onto the 1588 local time keeper through lines CPU_sec and CPU_nsec lines 430 as shown in FIG. 4. The converted time signal 514 will then be added to the contents of the interim counters 403, 404 representing the time counted 520 from the moment current time 504 was presented to the processor until the converted time 514 was recieved and the 1588 local time keeper 202 will be initialized with the summed value.

In a further preferred embodiment, the device 200 comprises LoadIEEE and LoadUTC flag signals generated from the CPU interface module 201 upon receipt of the stop conversion StopConversion signal 530. If the flag_IEEE2UTC line is asserted, such as shown by reference numeral 501, the stop conversion StopConversion signal is propagated to the Load_UTC signal. This will be translated by the time update controller TimeUpdateController 206 into the respective load_tkeep signals. In other words, when the flag_IEEE2UTC line is asserted, the LoadIEEE signal will translate into the Load_tkeep signal for the 1588 Time Keeper 202 and, when the flag_UTC2IEEE line is asserted, the Load_UTC signal will translate into the Load_tkeep for the UTC Time Keeper 203. The data corresponding to the converted time from the processor 207 is then loaded into the appropriate time keepers 202, 203 through the CPU_sec & CPU_nsec lines 330 and 430, shown in FIGS. 3 and 4.

As also illustrated in FIG. 5, in a preferred embodiment, the time update controller 206 sends an initiate conversion signal Flag_init on line 252, which signal is shown generally by reference numeral 252 in FIGS. 2 and 5. The Flag_init pulse signal, as shown generally by reference numeral 252 is generated together with the conversion request signal ConvRequest signal 510 as illustrated in FIG. 5. The signal Flag_init, operates to clear the contents of the corresponding TimeKeeper that will be receiving the converted value, in this case the 1588 Time Keeper 202. The initiate conversion signal Flag_init signals 252 are not generated both at the same time, so that only one TimeKeeper 202, 203 will be cleared at any one time.

Figure 6:
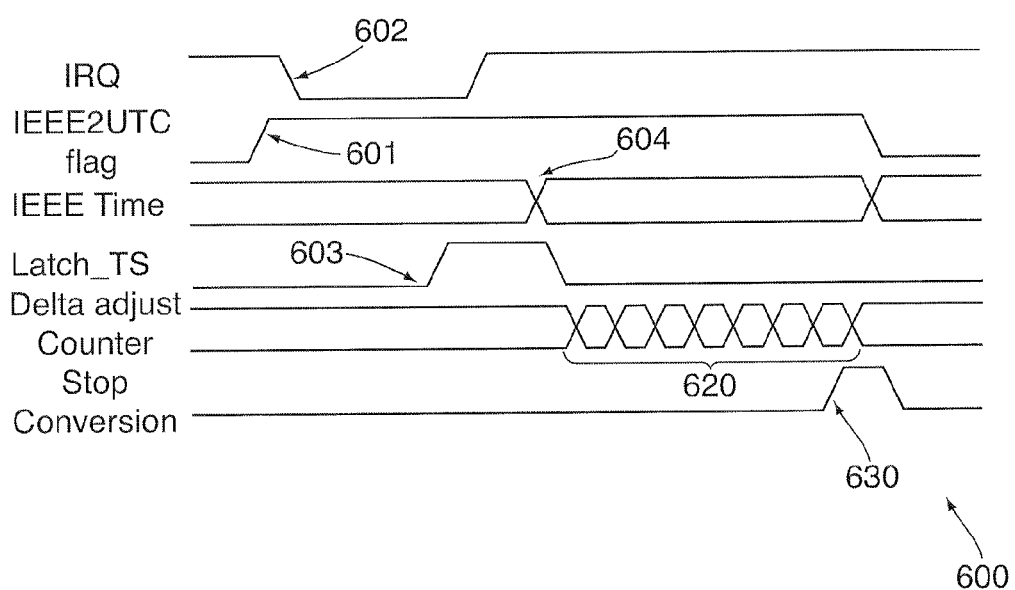
FIG. 6 is a timing diagram illustrating the IEEE to UTC time format conversion.

FIG. 6 illustrates the time conversion from IEEE format to UTC format. For ease of reference, FIG. 6 is a simplified version of FIG. 5. As shown in FIG. 6, the time conversion from IEEE to UTC is initially instigated by the time update controller 206 asserting the IEEE2UTC flag with the CPU interface 201 as shown generally by reference numeral 601 in FIG. 6. As indicated above, the conversion request signal Conversion_Request will also be asserted. Upon receipt of the IEEE2UTC flag, the CPU interface 201 will interrupt the processor 207 through the interrupt signal IRQ going low, shown generally by reference numeral 602. In response to the interrupt signal IRQ going low 602, the processor 207 will send the latch time request signal Latch_TS as shown by reference numeral 603. In response to the latch time request signal Latch_TS, the time update controller 206 will cause the current IEEE time to be sent to the processor 207, as shown by reference numeral 604, and substantially simultaneously will commence the delta adjustment 203d in the UTC local time keeper 203. At this time, the conversion counters 316, 317, 318, 319, 320 in the UTC delta adjustment 203d will commence counting the adjustment time. This will occur for a time period until the stop conversion signal Stop_Conversion is received, as shown generally by reference numeral 630. During this time period, illustrated generally by reference numeral 620 in FIG. 6, the conversion time counters 316 to 320 will count the time elapsed since the IEEE time was sent to the processor 207 until the stop conversion Stop_Conversion signal is received at 630.

Once the processor 207 has converted the IEEE time into UTC time format, the processor 207 will assert the stop conversion Stop_Conversion signal as shown by reference numeral 630 and substantially simultaneously provide the converted time on the local bus 231 to the CPU interface 201. The CPU interface 201 will then transmit the converted time to the time update controller 206 together with the load UTC time signal. The converted time will be loaded onto the UTC time keeper 203 on lines 330 and added to the time counted by the conversion time counters 316 to 320, and the UTC time keeper 203 will be initialized with this summed value. Additional signals, such as flag_init and load_tkeep illustrated in FIG. 2 will also facilitate the time of the controller 206 by controlling the initialization of the UTC time keeper 203 in a manner similar to that discussed above with respect to FIG. 5 and the IEEE time counter 202.

Figure 7:
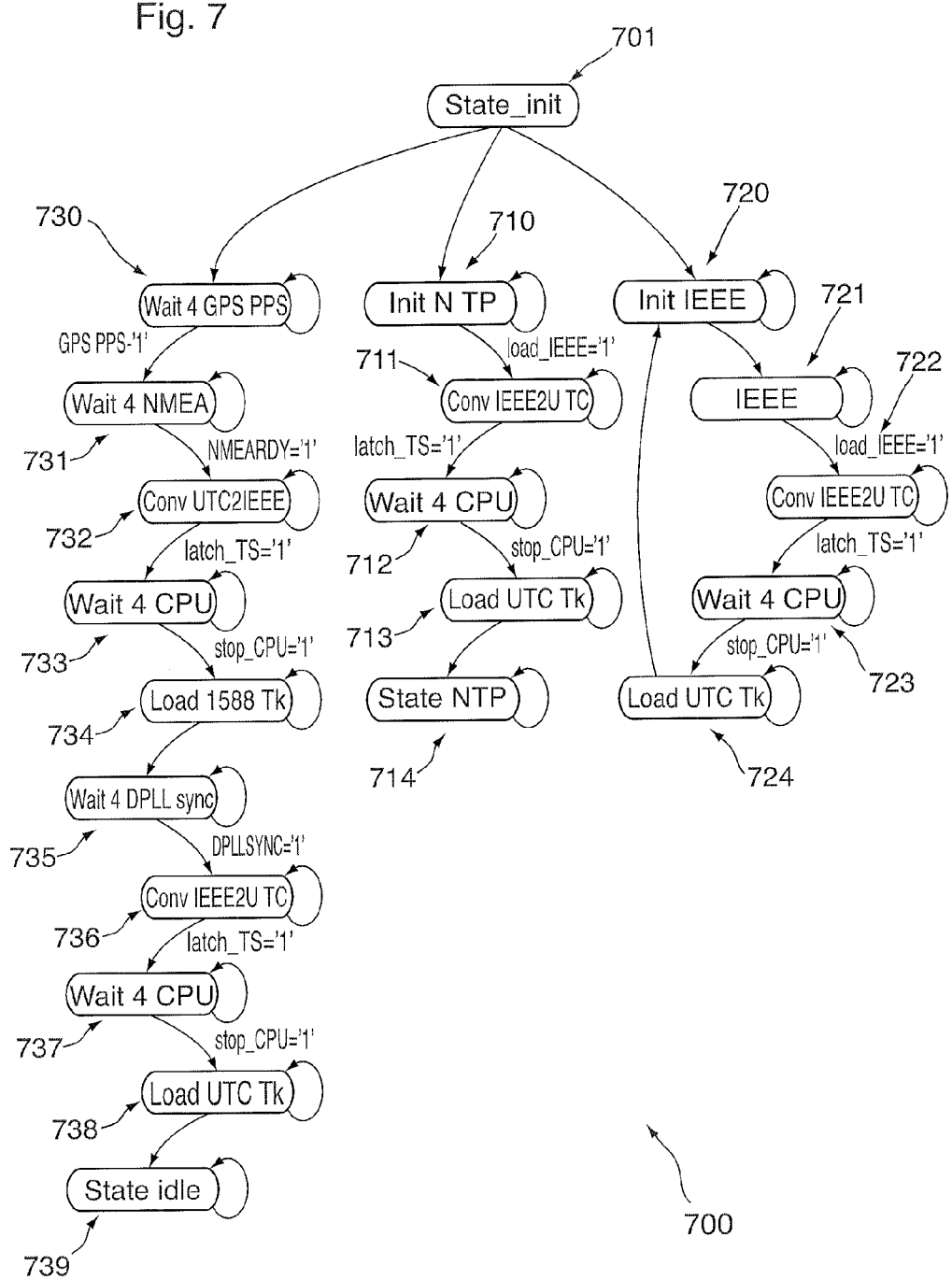
FIG. 7 is a flow chart illustrating the method of performing the time conversion between the IEEE 1588 and UTC time format according to one embodiment of the present invention.

FIG. 7 illustrates a simplified flow diagram, shown generally by reference numeral 700, showing the state machine algorithm that governs the functionality of the device 200. Based on the clock selection configuration received from the processor 207, the flow diagram 700 will enter one of the three main flows, namely GPS time reference 730, NTP time reference 710 or 1588 time reference 720.

Whenever the time reference selected is IEEE 1588 standard, the controller 206 enters a transition state init_IEEE, shown generally by reference numeral 720, and steps into the IEEE state 721 on the next clock tick. In the IEEE state 721, the controller 206 waits for the initialization of the IEEE time keeper 202. Whenever the processor 207 loads the initial value in the IEEE time keeper 202, the device 200 steps into the convert IEEE2UTC state 722 where the controller 206 requests a time conversion to the processor 207 to convert the current IEEE time format into UTC time format. This is done by toggling the IRQ signal line 602 and asserting the IEEE2UTC flag 601 as described above.

When the processor 207 is ready to perform the time conversion, the processor 207 will toggle the latch time request Latch_TS in the CPU interface 201, as shown by reference numeral 603 in timing diagram 600. This triggers the controller 206 to step into the wait4CPU state 723 and the device 200 to latch the current value of the IEEE time keeper 202 to the CPU interface 201 and to present it to the processor 207 on the local bus 231 for conversion. At this moment, the UTC delta adjustment circuit 203d starts counting to account for the time conversion delay which elapses from this moment 604 when the latched IEEE time is presented to the processor 207 until the converted UTC time is being loaded into the UTC time keeper 203 through lines 330, which period of time is also represented by reference numeral 620.

Once the processor 207 completes the time conversion from IEEE standard time format to the UTC time format, the processor 207 will toggle the stop conversion Stop_Conversion line in the CPU interface module 201, represented by reference numeral 630 in timing diagram 600, which indicates that the converted time signals have been received from the processor 207 and are presented on the CPU_sec and CPU_nsec lines 330 and also causes the controller 206 to step into the load UTC time keeper load_UTC_tk state 724. In this state 724, the UTC time keeper 203 will load the time value resulted by the BCD addition of the converted value from the processor 207, which corresponds to the IEEE at the time instance 604 when the latch time request Latch_TS signal was asserted and the time conversion delay which elapsed since that moment, which value is being stored in the conversion time counters 316 to 320 shown in FIG. 3. On the following clock tick, the controller 206 steps into the transitional Init_IEEE state 720 and on the next clock tick, it settles back into the IEEE state 721. The controller 206 will exit the IEEE state 721 whenever there is a reload of the IEEE timekeeper 202, such as would occur, for example, in a step change in the 1588 time in order to speed up the convergence process to the master time, or if there is a change in the time reference, such as, for example, a GPS time reference signal becomes available.

Whenever the time reference selected is reference time protocol (NTP), the algorithm 700 will flow very similar to the one described above with respect to IEEE time reference. The processor 207 loads the 1588 time format into the IEEE time keeper 202 and then the FPGA 10 will require an IEEE time format to UTC time format conversion shown by reference numeral 711. The controller 206 will then perform an IEEE time format to UTC time format conversion following steps 712, 713 and 714 which are similar to steps 722, 723 and 724 discussed above. After having performed the IEEE2UTC time conversion, the system settles in the NTP state 714 and will exit the NTP state 714 if there is a change in the time reference, such as, for example, if GPS time reference becomes available.

Whenever the time reference selected is GPS, the device 200 enters the transition wait4GPS state 730. The device 200 will transition to the wait4NMEA state 731 on the first GPS PPS pulse received from the GPS time reference. In the wait4NMEA state 731, the controller 206 waits for the NMEA message that contains the time value of the GPS PPS signal. As soon as the NMEA parser module 205 receives the corresponding NMEA message, the NMEA parser module 205 asserts the NMEA ready NMEA_RDY signal which will trigger the controller 206 to transition to the convert UTC2IEEE state 732. In this convert UTC2IEEE state 732, the controller 206 requests a time conversion from the processor 207 by toggling the IRQ signal shown by reference numeral 502 in timing drawing 500 and asserts the UTC2IEEE flag 501 as illustrated in FIG. 5.

When the processor 207 is ready to perform the time conversion from the UTC time format to the IEEE time format, the processor 207 toggles the latch time request Latch_TS signal as shown by reference numeral 503 in FIG. 5, in the CPU interface module 201, which triggers the controller 206 to step into the wait4CPU state 733. In the wait4CPU state 733, the controller 206 presents the current value of the NMEA time value to CPU for conversion as shown by reference numeral 504 in diagram 500. At this moment, the time conversion corrector module 406 starts the interim_nsec and interim_sec counters 403, 404 counting the time conversion delay which elapsed from this moment until the converted IEEE time is being loaded into the IEEE time keeper 202, which is also represented by reference numeral 520 in timing diagram 500.

Once the processor 207 has completed the conversion from the UTC time format to the IEEE 1588 time format, the processor 207 toggles the stop conversion Stop_Conversion bit in the processor interface module 201 as shown by reference numeral 530 in timing diagram 500, which indicates that the converted time signals have been returned from the processor 207 and are presented on the CPU_sec and CPU_nsec lines 430 causes the controller 206 to step into the load IEEE time keeper load__1588tk state 734. In this state 734, the IEEE time keeper 202 will load the time value resulting from the addition of the value presented by the processor 207, which corresponds to the time instance when the latch time request Latch_TS signal and is shown at reference point 514 was asserted and the time conversion delay which elapsed since that moment which value has been calculated by the interim counters 403, 404.

On the following clock tick, the controller 206 steps into the wait4DPLL_sync state 735 in which the controller 206 waits for the DPLL 204 to acquire synchronism with the GPS PPS signal. During this time period, the time accuracy of the IEEE time keeper 202 is monitored to be smaller than 500 ns.

When the DPLL 204 declares that it achieved synchronization with the GPS reference, the GPS 204 will assert a DPLL sync signal, which will cause the controller 206 to step into the convert IEEE2UTC state 736. In this state, the controller 206 will require a time conversion from the processor 207 of the current time in the IEEE format to the UTC format. This is accomplished through steps 737 and 738 which mirror steps 722, 723 and 724. In particular, when the processor 207 is ready to perform the time conversion, the processor 207 toggles the latch time request Latch_TS bit, represented by reference numeral 603 in timing diagram 600 in the CPU interface module 201 which triggers the controller 206 to step into the wait4CPU state 737. The controller 206 will latch the current value of the IEEE time keeper 202 and present it to the processor 207 for conversion as shown by reference numeral 604 in timing diagram 600. Substantially simultaneously therewith, the delta adjustment counters 316 to 320 will start counting for the time conversion delay which elapses from this moment until the converted UTC time has been returned from the processor 207 and is loaded into the UTC time keeper 203.

At the end of the time conversion by the processor 207, the processor 207 toggles the stop conversion Stop_Conversion bit in the CPU interface 201, as shown by reference numeral 630 in timing diagram 600 which causes the controller 206 to step into the load_UTC_tk state 738. In the load_UTC_tk state 738, the UTC time keeper will load the time value resulted from the BCD addition of the value presented by the processor 207, which corresponds to the time instance when the latch time request Latch_TS signal was asserted and is presented on CPU_sec and CPU_nsec lines 330 with the time conversion delay which elapsed since that moment, which value is calculated by the conversion time counters 306, 317, 318, 319, 320 shown in FIG. 3 and forming part of the UTC delta adjustment 203d. On the following clock tick, the controller 206 steps into the idle state 739. The controller 206 will exit the idle state 206 whenever there is a change in the time reference.

Figure 8:
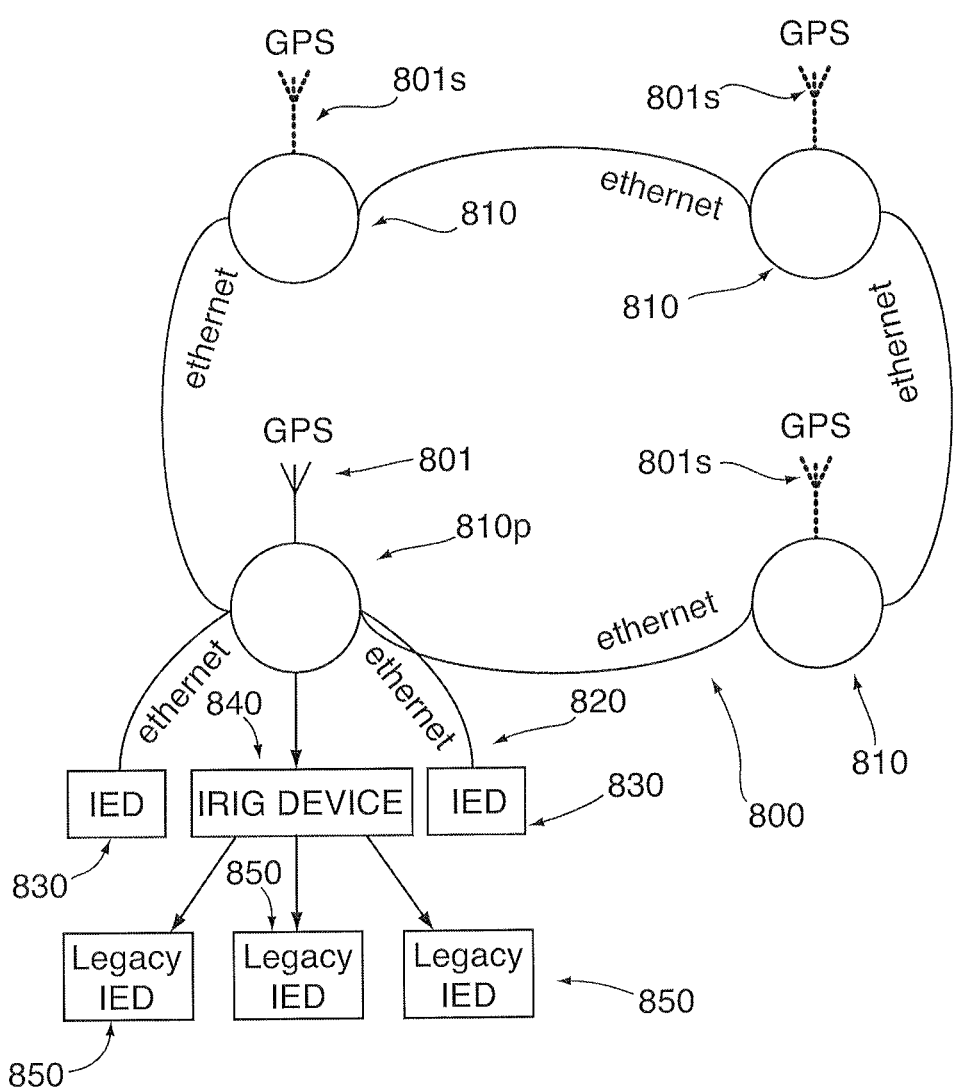
FIG. 8 is a synchronized Ethernet system with several substations and GPS standby antennas according to a further embodiment of the present invention.

FIG. 8 illustrates a network 800 having a number of local units 1 incorporating the device 200 according to one embodiment of the present invention. As illustrated in FIG. 8, the network 800 has a number of nodes 810. One principal node 810p is shown as having Ethernet connections to intelligent electronic devices (IED) 830. Usually, all the nodes in FIG. 8 have Ethernet and IRIG connections to IEDs. For simplicity, only for one node all the connections are illustrated. There is also a connection in the principal node 810p to an IRIG device 840. The IRIG device 840 has sub-connections to legacy IEDs 850.

The node 810 has a GPS antenna 801 which can be used to obtain the GPS time reference for the node 810p and which can then be transferred to the other nodes 810. As illustrated in FIG. 8, the other nodes 810 have a standby GPS antenna, as shown generally by reference numeral 810s and shown in dashed lines. The standby GPS antennas 801s are only required if the main GPS antenna 801 becomes inoperative. Furthermore, to decrease costs, a separate standby GPS antenna 801s is not required at each of the nodes 810, but could be used at only one of them.

The operation of the network 800 will have an Ethernet connection between the nodes 810. The Ethernet connection could have a time format based on the 1588 standard, UTC time format or any other time formats. Each of the nodes 810 may have a local unit 1, such as a FPGA 10, and comprise a device 200 according to an embodiment of the present invention to be able to convert a first time format such as the IEEE time format, into another, or second, time format, different from the first time format, such as the UTC time format. This conversion will permit the network 800 to operate on any one of the time formats. More specifically, this conversion will permit the Ethernet network 800 to operate on the 1588 standard time format which would avoid the need to have active GPS antennas GPS 801s at each of the nodes 810.

In the principal node 810p, the IEDs 830 may also utilize the 1588 standard time format. The IRIG device 840 is a UTC time format and therefore the node 810p will be providing time signals in both formats, namely 1588 standard to the IED's 830 and UTC to the IRIG device 840. Similarly, the IRIG device 840 may have a subsequent legacy IED 850 to which it provides timing signals to in UTC time format. In this way, the node 810p is more versatile and can provide timing signals in different time formats depending on the devices 830, 840 connected thereto.

FIG. 1 illustrates a further embodiment of the present invention. As shown in FIG. 1, a device 200 is contained within each of the line modules 103 NM1, NM2, NM3 and NM4 as well as the control module 102 (CM). In this way, time format conversions can be made through the processor 207 in each of the line modules 103 and the control modules 102 to receive or send timing signals in the 1588 standard time format. However, because the line modules 103 and the control module 102 are connected through a backplane 101, which operates in IRIG B time format, which is a UTC time format, the line modules 103 and control module 102 can communicate between each other using the IRIG time format of the backplane 101. Accordingly, the devices 200 permit sufficiently accurate time conversions and also simultaneous counting in different time formats, which, in this preferred embodiment, comprised of 1588 and UTC time formats to permit the line modules 103 and control module 102 to operate simultaneously in both time formats as shown in FIG. 1. In this way, existing standards for backplanes 101 which have a UTC time format, and principally the IRIG B time format, can be used even though the line modules 103 and control module 102 may also utilize different time formats, such as the 1588 time format internally.

Turning to FIG. 2, to facilitate communication through IRIGB, the device 200 may comprise an IRIG encoder 208, which receives the time of day UTC time format and converts it to an IRIG format, such that it can be used through the backplane 101. Similarly, to facilitate time referencing, the device 200 may comprise an IRIG decoder 209 which receives and IRIG time reference and converts it to an IRIG PPS which is sent to the time update controller 206. The time update controller 206 will treat the IRIG PPS for conversion in an similar manner to which the UTC time is converted except that with IRIG_B there are no NMEA messages, and the FPGA 10 can parse the IRIG_B time reference signal IRIG in order to extract the UTC time embedded in the IRIG time reference.

In the embodiments discussed in this disclosure, the CPU 207 has been shown to be external of the FPGA 10. In other implementations, the CPU 207 could be implemented inside the FPGA, and still have a similar set of interface signals with the time keepers 202, 203 and the controller 206 (the Time Keepers, the CPU interface and the Time Update Controller and the rest).

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

What is claimed is:

1. A method for converting from a first time format to a second time format at a local unit connected to a network utilizing a processor in the local unit, said second time format different from the first format, said method comprising:

utilizing a first counter at the local unit to count time in the first time format;

receiving at a processor interface a latch time request signal from the processor;

in response to the latch time request signal, sending a set time signal representing current time in the first time format to the processor representing time of receipt of the latch time request signal in the first time format, and, substantially simultaneously commencing an adjustment time counter in a second counter at the local unit to count adjustment time in the second time format;

receiving a set time converted signal from the processor representing the current time converted into the second time format;

in response to receiving the set time converted signal, summing the set time converted in the second time format as represented by the set time converted signal received from the processor to the adjustment time counted in the adjustment time counter in the second counter; and initializing a time base in the second counter in the second time format based on the sum of the set time converted in the second time format and the adjustment time counted in the adjustment counter in the second counter in the second time format.

2. The method as defined in claim 1 further comprising:

after conversion to the second time format, utilizing the first counter to count time in the first time format; and utilizing the second counter to count time in the second format.

3. The method as defined in claim 1 wherein the processor is a multitasking processor executing undetermined other tasks when the set time signal is received.

4. The method as defined in claim 1 wherein only one of the first time format or the second time format is a Universal Time (UTC) based time format.

5. The method as defined in claim 4 wherein one of the first time format or the second time format is based on IEEE 1588 Standard.

6. The method as defined in claim 5 wherein at least one of the first time format or the second time format is UTC based time format selected from the group consisting of Global Positioning Satellite (GPS) and Inter Range instrumentation Group (IRIG).

7. The method as defined in claim 1 wherein the local unit is selected from the group consisting of Field Programmable Gate Arrays, Switches and Routers.

8. The method as defined in claim 1 wherein the time conversion occurs at initialization or network interruptions.

9. The method as defined in claim 1 wherein the local unit is a Line Module, the first time format is IEEE 1588 Standard and the second time format is Inter Range Instrumentation Group (IRIG-B).

10. The method as defined in claim 2, wherein the time references outputted by the first time counter and the second time counter are synchronized within 10ns.

11. A device for facilitating conversion between a first time format and a second time format different from the first time format, utilizing a processor, said device comprising:
   a processor interface for sending and receiving signals to and from the processor;
   a first counter for counting time in the first time format;
   a second counter for counting time in the second time format;
   a time update controller connected to the first time counter, the second time counter and the processor interface;
   wherein, when the processor interface receives a latch time request signal from the processor, the update controller sends a set time signal representing current time in the first time format to the processor and commences an adjustment counter in the second counter in the second time format; and
   wherein, when the processor interface receives a set time converted signal representing the current time converted to the second time format from the processor, the second counter sums the set time converted to the second time format as represented by the set time converted signal with the contents of the adjustment counter in the second counter to initialize a time base in the second time format.

12. The device as defined in claim 11 wherein after the conversion from the first time format to the second time format, the first counter counts time in the first time format and the second counter counts time in the second time format.

13. The device as defined in claim 11 wherein the time update controller initially sends a request time conversion to the processor to initiate the time conversion; and
   wherein the latch time request signal is sent from the processor in response to the request time conversion signal.

14. The device as defined in claim 11 wherein one of the first time format or the second time format is based on IEEE 1588 Standard.

15. The device as defined in claim 11 wherein the time update controller sends the request time conversion signal at initialization of the network or after a network interruption.

16. The device as defined in claim 14 wherein at least one of the first time format or the second time format is UTC based time format selected from the group consisting of Global Positioning Satellite (GPS) and Inter Range Instramentation Group (IRIG-B).

17. The device as defined in claim 11 wherein the local unit is selected from the group consisting of Field Programmable Gate Arrays, Switches, Routers, line modules and control modules.

18. In a network having a plurality of nodes, each node connected to the network and communicating with at least one other remotely located node connected to the network, a system for converting between different time formats at the local unit, said system comprising:
   in a first node:
      a first counter for counting time in a first time format;
      a second counter for counting time in a second time format;
      a processor for converting time in the first time format to the second time format:
      a processor interface for sending and receiving signals to and from the processor; and
      a time update controller connected to the first time counter, the second time counter and the external processor interface;
   wherein when the processor interface receives a latch time request signal from the processor, the update controller sends a set time signal representing the current time in the first time format to the processor and commences an adjustment counter in the second counter in the second time format;
   wherein when the processor receives the set time signal, the processor converts the current time as represented by the set time signal from the first time format to the second time format and sends a set time converted signal representing the current time converted to the second time format; and
   wherein when the processor interface receives the set time converted signal from the processor, the second counter sums the set time converted to the second time format as represented by the set time converted signal, with the contents of the local adjustment counter to initialize a time base in the second time format.

19. The system as defined in claim 18 further comprising:
   in one of the nodes of the network:
   a GPS antenna for obtaining UTC time and sending UTC network time reference signals to at least one other node in the network representing the UTC time reference obtained from the GPS antenna; and
   in the first node:
   wherein the first time format is UTC time format obtained from the GPS antenna and the UTC network time reference signals; and
   wherein the set time signal representing the current time in the first time format corresponds to the time represented by the UTC network time reference signal.

20. The system as defined in claim 19 wherein the UTC time format is converted to IEEE time format and stored in the second time counter; and
   wherein after the IEEE time in the second time format has been stored in the second counter, the second time format is converted to the first time format using the processor and the first counter is initialized with the UTC time converted from the second time format.

21. The system as defined in claim 19 further comprising:
   in a second node different from the first node:
   a standby GPS antenna for obtaining UTC time and sending the UTC network time reference signals to at least one other node in the network representing the UTC time reference obtained by the GPS standby antenna; and wherein the GPS standby antenna is operational only if the GPS antenna is not operational.

* * * * *